United States Patent
Keith et al.

(10) Patent No.: US 9,782,951 B2
(45) Date of Patent: Oct. 10, 2017

(54) COMPOSITE STRUCTURE HAVING CERAMIC TRUSS CORE AND METHOD FOR MAKING THE SAME

(75) Inventors: William P. Keith, Lakewood, CA (US); Buddhadev Chakrabarti, Walnut, CA (US); Leanne Lehman, Aliso Viejo, CA (US)

(73) Assignee: THE BOEING COMPANY, Chicago, IL (US)

(*) Notice: Subject to any disclaimer, the term of this patent is extended or adjusted under 35 U.S.C. 154(b) by 2662 days.

(21) Appl. No.: 11/779,439

(22) Filed: Jul. 18, 2007

(65) Prior Publication Data
US 2009/0019685 A1 Jan. 22, 2009

(51) Int. Cl.
| | | |
|---|---|---|
| *B32B 7/08* | (2006.01) | |
| *C04B 35/628* | (2006.01) | |
| *B32B 5/18* | (2006.01) | |
| *B32B 5/24* | (2006.01) | |
| *B32B 5/26* | (2006.01) | |

(Continued)

(52) U.S. Cl.
CPC ............ *B32B 7/08* (2013.01); *B32B 5/18* (2013.01); *B32B 5/245* (2013.01); *B32B 5/26* (2013.01); *B32B 9/005* (2013.01); *B32B 9/047* (2013.01); *C04B 35/62844* (2013.01); *B32B 2250/40* (2013.01); *B32B 2260/023* (2013.01); *B32B 2262/105* (2013.01); *B32B 2266/08* (2013.01); *B32B 2307/306* (2013.01); *B32B 2605/08* (2013.01); *B32B 2605/18* (2013.01); *Y10T 29/49904* (2015.01)

(58) Field of Classification Search
CPC .... B32B 3/06; B32B 3/04; B32B 5/02; B32B 9/005; B32B 2260/023; B32B 2262/105; B32B 2605/18; B29C 70/34; Y10T 428/2419; Y10T 428/24008; Y10T 29/49904; Y10T 29/49885; Y10T 29/49863; Y10T 29/49622
USPC ......... 29/897.2, 446, 469, 458, 428; 156/60, 156/89.11, 292, 307.1
See application file for complete search history.

(56) References Cited

U.S. PATENT DOCUMENTS

| | | | |
|---|---|---|---|
| 3,579,411 A | * | 5/1971 | Mackie et al. .................. 428/102 |
| 4,103,470 A | | 8/1978 | Cook |

(Continued)

FOREIGN PATENT DOCUMENTS

| | | | |
|---|---|---|---|
| DE | 102006056568 A1 | 6/2008 | |
| EP | 2017073 A2 * | 1/2009 | ............... B32B 7/08 |

(Continued)

OTHER PUBLICATIONS

European Search Report, dated Nov. 18, 2005, regarding Application No. EP08161510 (EP2025504), 5 pages.

(Continued)

*Primary Examiner* — Moshe Wilensky
(74) *Attorney, Agent, or Firm* — Yee & Associates, P.C.

(57) ABSTRACT

A CMC sandwich used to fabricate CMC structures includes facesheets bonded to a core reinforced with a ceramic truss comprising an array of CMC pins. The binder matrix in the ends of the pins is removed, leaving exposed, flexible ceramic fibers. The exposed ceramic fibers are bent so as to extend parallel to the facesheets, and are bonded to one or more plies of the facesheets. The binder matrix in the ends of the ceramic pins may be removed by mechanical or chemical processes.

13 Claims, 7 Drawing Sheets

(51) Int. Cl.
*B32B 9/00* (2006.01)
*B32B 9/04* (2006.01)

(56) References Cited

U.S. PATENT DOCUMENTS

| | | | | |
|---|---|---|---|---|
| 4,113,549 A * | 9/1978 | Brimm | C23F 1/02 | 216/100 |
| 4,151,031 A * | 4/1979 | Goad | B29C 53/043 | 156/201 |
| 4,361,613 A * | 11/1982 | Bogner et al. | 428/119 | |
| 4,556,591 A * | 12/1985 | Bannink, Jr. | 428/43 | |
| 4,556,592 A * | 12/1985 | Bannink, Jr. | 428/43 | |
| 4,588,474 A * | 5/1986 | Gross | C23F 1/36 | 216/102 |
| 4,614,013 A | 9/1986 | Stevenson | | |
| 4,664,731 A * | 5/1987 | Layden | C03B 17/04 | 156/242 |
| 4,709,714 A | 12/1987 | Nishino et al. | | |
| 4,786,343 A * | 11/1988 | Hertzberg | 156/93 | |
| 4,808,461 A * | 2/1989 | Boyce | B29C 66/472 | 156/285 |
| 4,822,660 A | 4/1989 | Lipp | | |
| 5,102,723 A | 4/1992 | Pepin | | |
| 5,177,039 A * | 1/1993 | Allaire et al. | 501/95.2 | |
| 5,225,015 A * | 7/1993 | Allaire | C03B 11/14 | 156/155 |
| 5,506,018 A * | 4/1996 | Jacob | B29C 37/0082 | 428/113 |
| 5,589,015 A * | 12/1996 | Fusco | B29C 65/564 | 156/303.1 |
| 5,632,834 A | 5/1997 | Ostertag et al. | | |
| 5,650,229 A * | 7/1997 | Gross | B29B 11/06 | 428/113 |
| 5,667,859 A * | 9/1997 | Boyce | B29C 65/564 | 428/300.7 |
| 5,789,061 A * | 8/1998 | Campbell | B29C 65/564 | 156/73.1 |
| 5,827,383 A * | 10/1998 | Campbell et al. | 156/73.1 | |
| 5,869,165 A | 2/1999 | Rorabaugh et al. | | |
| 5,876,652 A | 3/1999 | Rorabaugh et al. | | |
| 5,958,550 A | 9/1999 | Childress | | |
| 6,291,049 B1 * | 9/2001 | Kunkel et al. | 428/99 | |
| 6,511,727 B1 * | 1/2003 | Bleibler et al. | 428/50 | |
| 6,645,333 B2 * | 11/2003 | Johnson et al. | 156/92 | |
| 6,676,785 B2 * | 1/2004 | Johnson et al. | 156/92 | |
| 6,716,782 B2 | 4/2004 | Heng et al. | | |
| 6,740,381 B2 | 5/2004 | Day et al. | | |
| 6,746,755 B2 | 6/2004 | Morrison et al. | | |
| 6,830,286 B2 * | 12/2004 | Bechtold et al. | 296/187.03 | |
| 6,969,546 B2 | 11/2005 | DiChiara, Jr. | | |
| 7,056,576 B2 * | 6/2006 | Johnson | 428/309.9 | |
| 7,105,071 B2 * | 9/2006 | Johnson et al. | 156/92 | |
| 7,200,912 B2 * | 4/2007 | Bouillon et al. | 29/432 | |
| 7,217,453 B2 * | 5/2007 | Johnson et al. | 428/292.1 | |
| 7,264,991 B1 * | 9/2007 | Lin | H01L 21/6835 | 438/106 |
| 7,312,274 B2 * | 12/2007 | Millard et al. | 524/588 | |
| 7,424,967 B2 * | 9/2008 | Ervin et al. | 228/193 | |
| 7,731,046 B2 * | 6/2010 | Johnson | 220/62.15 | |
| 7,758,715 B2 * | 7/2010 | Petersson et al. | 156/307.1 | |
| 7,785,693 B2 * | 8/2010 | Johnson et al. | 428/99 | |
| 7,846,528 B2 * | 12/2010 | Johnson et al. | 428/119 | |
| 7,891,096 B2 * | 2/2011 | Weber et al. | 29/897.2 | |
| 7,972,430 B2 * | 7/2011 | Millard et al. | 106/287.1 | |
| 8,034,428 B2 * | 10/2011 | Verhaeghe | 428/86 | |
| 8,038,894 B2 * | 10/2011 | Brooks | 216/52 | |
| 8,097,106 B2 | 1/2012 | Hand et al. | | |
| 8,127,450 B2 * | 3/2012 | Weber et al. | 29/897.32 | |
| 2001/0031350 A1 * | 10/2001 | Day | B29C 70/086 | 428/317.9 |
| 2002/0007607 A1 | 1/2002 | Matlack et al. | | |
| 2002/0053176 A1 | 5/2002 | Colson et al. | | |
| 2002/0144767 A1 | 10/2002 | Johnson et al. | | |
| 2003/0059577 A1 | 3/2003 | Morrison et al. | | |
| 2005/0025948 A1 | 2/2005 | Johnson et al. | | |
| 2005/0112321 A1 | 5/2005 | Millard et al. | | |
| 2006/0163319 A1 * | 7/2006 | Ervin et al. | 228/101 | |
| 2007/0020960 A1 * | 1/2007 | Williams | H01R 13/2407 | 439/66 |
| 2007/0193146 A1 | 8/2007 | Carstensen et al. | | |
| 2008/0297453 A1 * | 12/2008 | Ray | H01L 27/3281 | 345/82 |
| 2009/0005232 A1 | 1/2009 | Hand | | |
| 2009/0019685 A1 | 1/2009 | Keith | | |
| 2009/0035510 A1 | 2/2009 | Chakrabarti | | |
| 2009/0320292 A1 * | 12/2009 | Brennan | B29C 70/446 | 29/897.2 |
| 2010/0102172 A1 * | 4/2010 | Bardwell | B64C 3/28 | 244/134 D |
| 2010/0151189 A1 * | 6/2010 | Chakrabarti | E04C 2/296 | 428/119 |
| 2011/0097554 A1 * | 4/2011 | Kehrl | B29C 70/207 | 428/174 |
| 2013/0230690 A1 | 9/2013 | Chakrabarti | | |
| 2015/0367619 A1 * | 12/2015 | Butler | B29C 70/545 | 428/57 |

FOREIGN PATENT DOCUMENTS

| | | | |
|---|---|---|---|
| EP | 20025504 A1 | 2/2009 | |
| JP | 2009023348 A * | 2/2009 | B32B 18/00 |

OTHER PUBLICATIONS

European Search Report, dated Dec. 5, 2011, regarding Application No. EP08252351 (EP2017073), 8 pages.

USPTO Office Action dated Nov. 23, 2011, regarding U.S. Appl. No. 11/831,066, 13 pages.

USPTO Final Office Action dated Mar. 30, 2012, regarding U.S. Appl. No. 11/831,066, 12 pages.

USPTO Office Action dated Nov. 29, 2011, regarding U.S. Appl. No. 12/705,675, 11 pages.

USPTO Final Office Action dated Apr. 2, 2012, regarding U.S. Appl. No. 12/705,675, 10 pages.

State Intellectual Property Office of PRC Notification of Second Office Action and English Translation, issued Jul. 3, 2015, regarding Application No. 201410057572.2, 16 pages.

Notice of Allowance, dated Sep. 24, 2013, regarding USPTO U.S. Appl. No. 13/866,518, 8 pages.

Office Action, dated Sep. 5, 2012, regarding U.S. Appl. No. 11/831,066, 18 pages.

Office Action, dated Sep. 5, 2012, regarding U.S. Appl. No. 12/705,675, 12 pages.

State Intellectual Property Office of PRC Notification of the Decision of Rejection, dated Jan. 13, 2016, regarding Application No. 2014100575422, 17 pages.

State Intellectual Property Office of PRC Reexamination Decision, dated Nov. 26, 2013, regarding Application No. 200810137725.X, 30 pages.

Chinese Office Action, dated Jul. 27, 2016, regarding Application 20141005754.2, 13 pages.

* cited by examiner

COMPOSITE STRUCTURE HAVING CERAMIC TRUSS CORE AND METHOD FOR MAKING THE SAME

TECHNICAL FIELD

This disclosure generally relates to ceramic composite structures, and deals more particularly with a composite sandwich construction having a ceramic truss core, and a method of making the same.

BACKGROUND

Ceramic matrix composite (CMC) structures may be used in aerospace and other applications because of their ability to withstand relatively high operating temperatures. For example, CMC structures may be used to fabricate parts subjected to high temperature exhaust gases in aircraft applications. One type of CMC structure employs a sandwich construction in which two CMC facesheets are bonded to a core. In one sandwich construction, the core may be reinforced by a truss-like array of CMC pins which extend through the thickness of the core and penetrate the facesheets. These pins provide load paths along which compressive, tensile and/or shear loads are transferred between the facesheets. The load carrying ability of this prior pin truss construction is limited however, due to the limited bond strength between the ends of the pins and the plies of the facesheets, especially where the facesheets are relatively thin.

The bond strength between the CMC pins and the facesheets may be increased if the ends of the pins could be bent so as to extend parallel to the facesheets, providing a greater bond area. This solution has not been feasible however, because the CMC pins are relatively brittle and may break if attempts are made to bend the ends of the CMC pins.

Accordingly there is a need for a CMC structure having a ceramic truss core exhibiting improved bonding properties between the core and the facesheets. Embodiments of the disclosure are intended to satisfy this need.

SUMMARY

A CMC structure includes a sandwich construction having a ceramic truss reinforced core. Superior bonding between the core and facesheets is achieved by bending the outer ends of CMC pins forming the truss. By bending the ends of the CMC pins, a greater bond area is provided between the pins and the facesheets, thereby improving the load transmitting ability of the core. The ends of the CMC pins may be bent by removing the matrix material from the pin ends which binds the ceramic fibers. With the matrix material removed, the remaining ceramic fibers are relatively flexible, allowing them to be bent so that they extend parallel to and may be bonded with the planar surfaces of the facesheets.

According to one disclosed method embodiment, a ceramic composite structure may be fabricated by the steps comprising: forming a core including a ceramic truss having a plurality of pins formed from ceramic fibers held in a rigid binder; removing the binder from the ends of the pins to expose the ceramic fibers; bending the ends of the pins; and, bonding a facesheet to the ends of the pins. The ceramic truss may be formed by inserting the pins into a carrier such that the ends of the pins protrude from the carrier. The binder in the ends of the pins is then removed by etching, pulverizing or ablative processes. Plies of the facesheets may be applied to the core, penetrating the ends of the pins before the binder material is removed from the ends of the pins. Following removal of binder material, the exposed ceramic fibers in the ends of the pins may be bonded to or between plies of the facesheets.

According to another method embodiment, a ceramic truss core used in a ceramic composite structure may be fabricated by a process comprising the steps of: forming a ceramic truss using a plurality of composite ceramic pins, wherein the composite ceramic pins comprise ceramic fibers held in a matrix; and, removing the matrix from the ends of the pins to expose the ceramic fibers. The truss may be formed by partially inserting the pins into a carrier foam such that the ends of the ceramic pins remain exposed. The matrix is removed from the ends of the pins so that only flexible ceramic fibers remain. The flexible ceramic fibers may be bent to conform to the surface of facesheets to which the core may be bonded. The matrix binder may be removed from the ends of the CMC pins by any of several processes, including etching, pulverizing or oblation. A layer of protective material may be applied over the carrier in order to protect the carrier during the matrix binder removal process.

According to a further method embodiment, a ceramic composite structure may be made by the steps comprising: fabricating a core, and bonding a facesheet to the core by bonding the facesheet to exposed, bent ends of ceramic fibers forming a part of the core. The core may be made by: forming an array of composite ceramic pins within a carrier, each of the pins comprising ceramic fibers held in a matrix and protruding from the carrier; removing the matrix from the protruding ends of the pins to expose portions of the ceramic fibers; and, bending the exposed portions of the ceramic fibers so that they may be bonded to the facesheet.

According to another embodiment, a composite ceramic structure comprises: a pair of generally parallel composite ceramic facesheets; and, a core including a truss disposed between and bonded to the facesheets, the truss including a plurality of composite ceramic pins, each of the pins including medial portions extending generally transverse to the facesheets, and distal portions extending generally parallel and bonded to the facesheets. At least one of the facesheets may include multiple plies, and the distal portions of the pins may be sandwiched between these plies. Alternatively, the distal portions of the pins may be bonded to an inside face of the facesheets.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
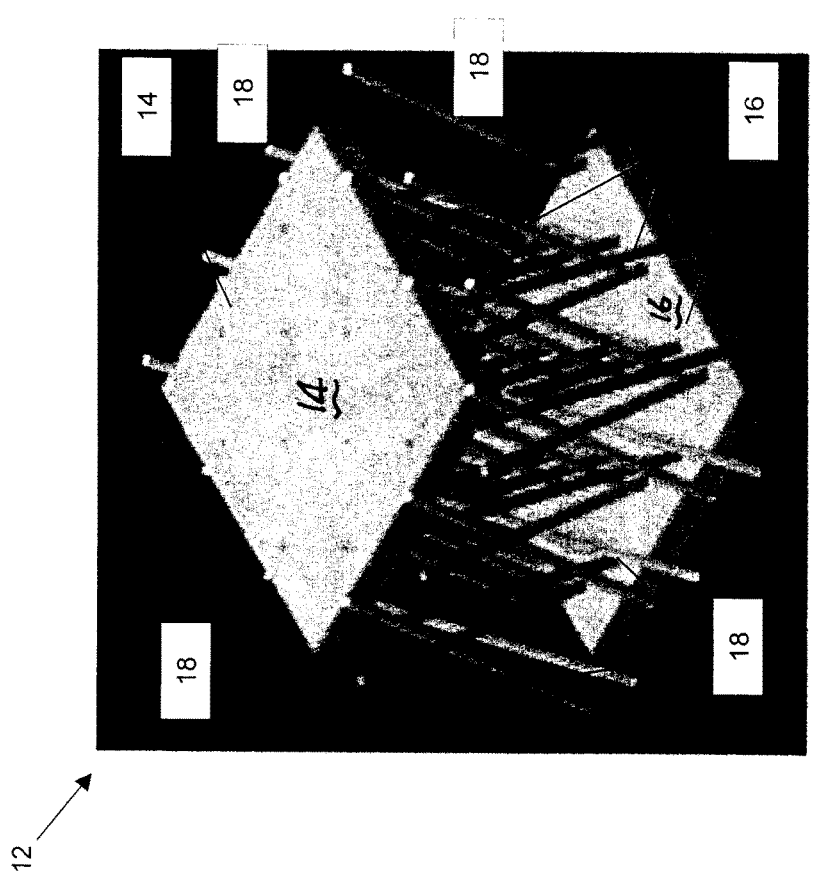
FIG. 1 is an isometric illustration of a prior art CMC sandwich construction employing a ceramic truss core, the carrier not shown and portions of the facesheets having been broken away to better show the straight ends of CMC pins.

Referring first to FIG. 1, a typical prior art CMC sandwich construction comprises a pair of parallel, CMC facesheets 14, 16 bonded to a core that includes an array of ceramic pins 18. The pins 18 are arranged in "X" patterns and function to reinforce a core that may include a structural foam (not shown). Each of the pins 18 is straight, and has outer ends extending through and bonded to facesheets 14, 16. The bond area between the pins 18 and the facesheets 14, 16 is limited to the depth of penetration of the ends of the pins 18 into the facesheets 14, 16.

Figure 2:
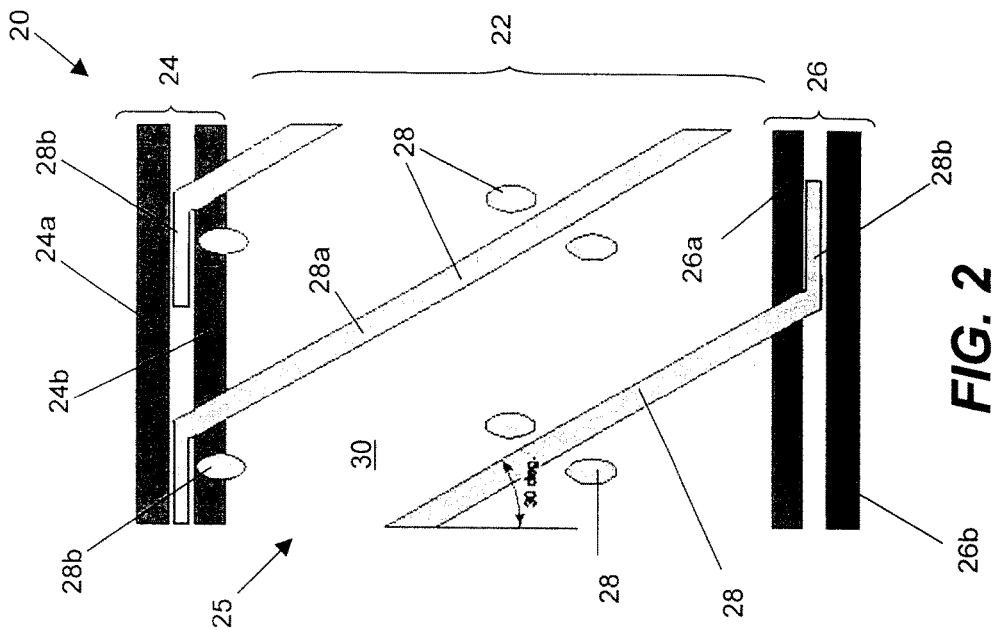
FIG. 2 is a cross sectional illustration of a portion of a CMC sandwich construction having a ceramic truss core according to an embodiment of the disclosure.
Figure 6:
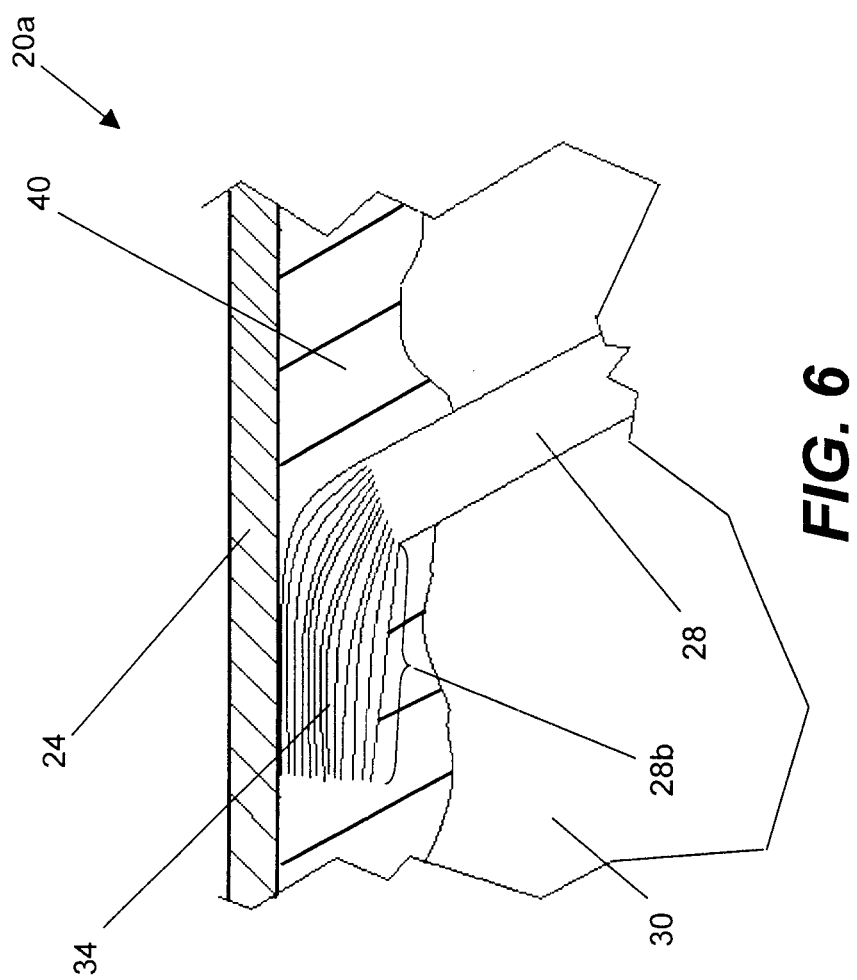
FIG. 6 is a cross sectional view illustrating an alternate embodiment of a CMC sandwich construction.
Figure 7:
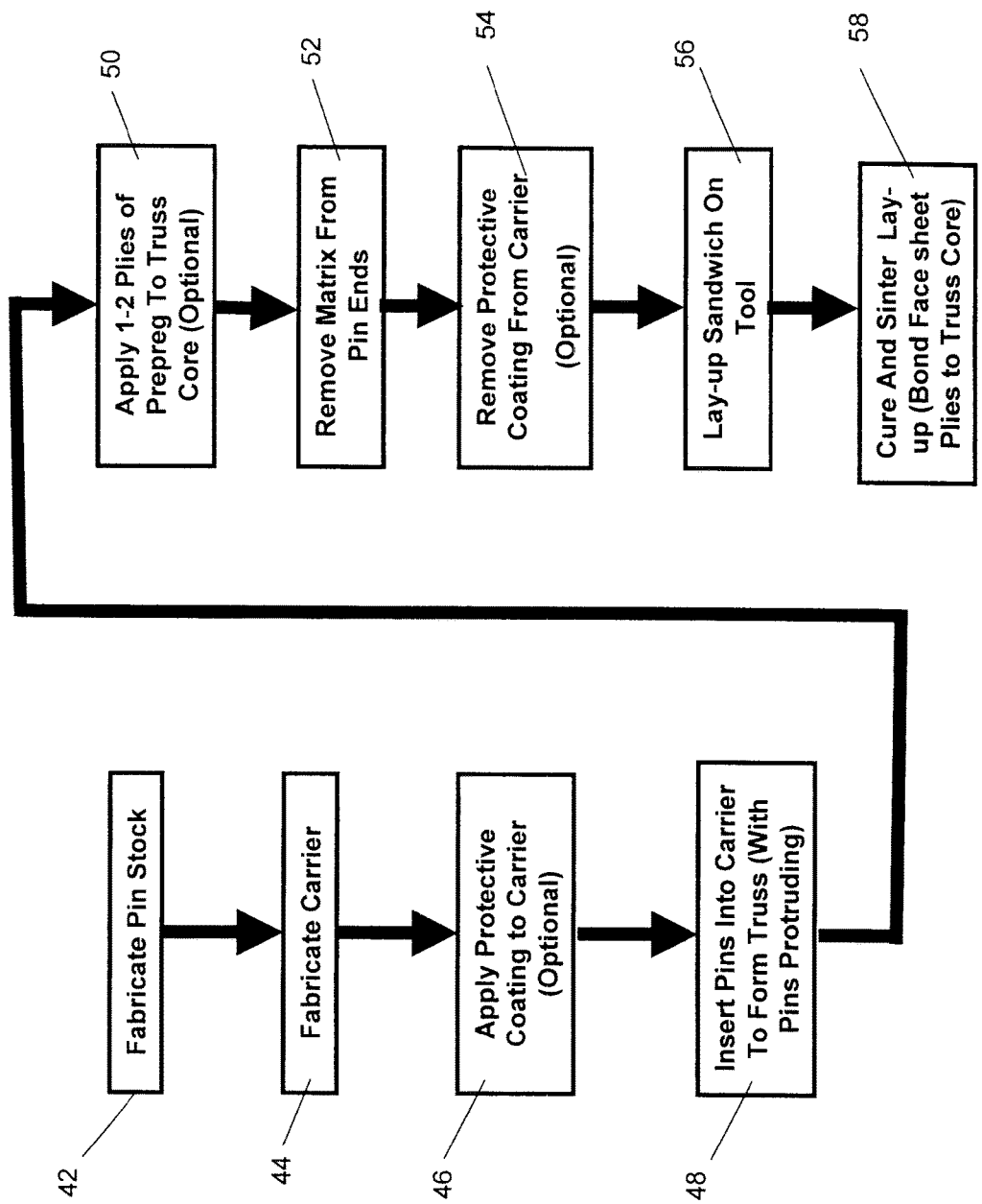
FIG. 7 is a simplified flow diagram illustrating the basic steps of a process used to fabricate a CMC sandwich having a ceramic truss core

Referring now to FIGS. 2 and 6, a CMC sandwich construction 20 broadly comprises a pair of generally parallel CMC facesheets 24, 26 bonded to a core 22. Core 22 may comprise a CMC truss 25 held within a layer 30 of structural or semi-structural foam. The truss 25 reinforces the core 22 and may function to transmit compressive, tensile and/or shear loads between the facesheets 24, 26. In the illustrated example, the facesheets 24, 26 are flat and extend substantially parallel to each other; however other geometries are possible, including without limitation, non-parallel curvilinear and combinations of curvilinear and rectilinear.

Each of the facesheets 24, 26 may comprise multiple layers or plies of ceramic cloth fibers dipped in a ceramic slurry. As used herein, the term "ceramic fiber" refers to the conventionally known and commercially available ceramic materials that are fabricated in fiber form. The ceramic fibers may include, but are not limited to, silicon carbide, silica, TYRANNO®, alumina, alumino-silicate aluminoborosilicate, silicon nitride, silicon boride, silicon boronitride, and similar materials. The truss structure 25 defines load paths that reinforce the sandwich construction 20 allowing CMC structures to be fabricated that are both self supporting and load carrying, if desired. The CMC sandwich 20 is particularly well suited to high temperature applications since all the constituents used in the sandwich 20 are ceramic-based.

Layer 30 forms a carrier for holding the truss 25 in place during fabrication, and may add structural rigidity to the sandwich 20, depending upon the materials used. The carrier layer 30 may comprise any of a variety of materials including for example, without limitation, organic fugitive foam, a lightweight, closed cell polymethacrylimide (PMI) foam, tile, rigidized batting, or other ceramic material. Further examples of ceramic materials that may be used as the carrier layer 30 include, without limitation, ceramic felt, other fibrous ceramic insulation (soft or rigid), monolithic ceramics, etc. One particular rigid foam suitable for use as the carrier layer 30 is disclosed in U.S. Pat. No. 6,716,782 issued Apr. 6, 2002 and assigned to The Boeing Company. The rigid foam insulation described in this prior patent is a combination of ceramic fibers that are sintered together to form a low density, highly porous material with low thermal conductivity. This foam exhibits high tensile strength and good dimensional stability. As used herein, "high temperature" material is generally intended to refer to temperatures above which polymeric materials exhibit diminished capacity.

The truss structure 25 comprises an array of CMC pins 28 extending through the thickness of the carrier layer 30, generally transverse to the facesheets 24, 26. The pins 28 are formed from pin stock comprising ceramic fibers held in a rigid ceramic binder or matrix. The pins 28 may be fabricated with materials that allow the matrix material to be etched away, for purposes which will be described below. The diameter of the individual fibers in the pins 28 is relative small compared to the overall pin 28; for example, in one satisfactory embodiment, the fibers may each have a diameter of approximately 11 micrometers, where the pin has an overall diameter of approximately 700 micrometers.

The pins 28 may be arranged in groups forming a geometric truss network, such as a tetragonal geometry, for example. Each of the pins 28 include straight, medial portions 28a, and opposite distal portions 28b which are sandwiched between and bonded to adjacent plies 24a, 24b and 26a, 26b of the respective facesheets 24, 26. In one embodiment, the pins 28 may form an angle of approximately 30 degrees relative to an axis extending normal to the facesheets 24, 26, as best seen in FIG. 2. The distal portions 28b of each of the pins 28 are bent, so as to extend generally parallel to the plane of the facesheets 24, 26. The length of the distal portions 28b will depend on the particular application; in one embodiment, a length approximately equal to 4 to 5 times the diameter of the pin 28 provided satisfactory results.

Figure 5:
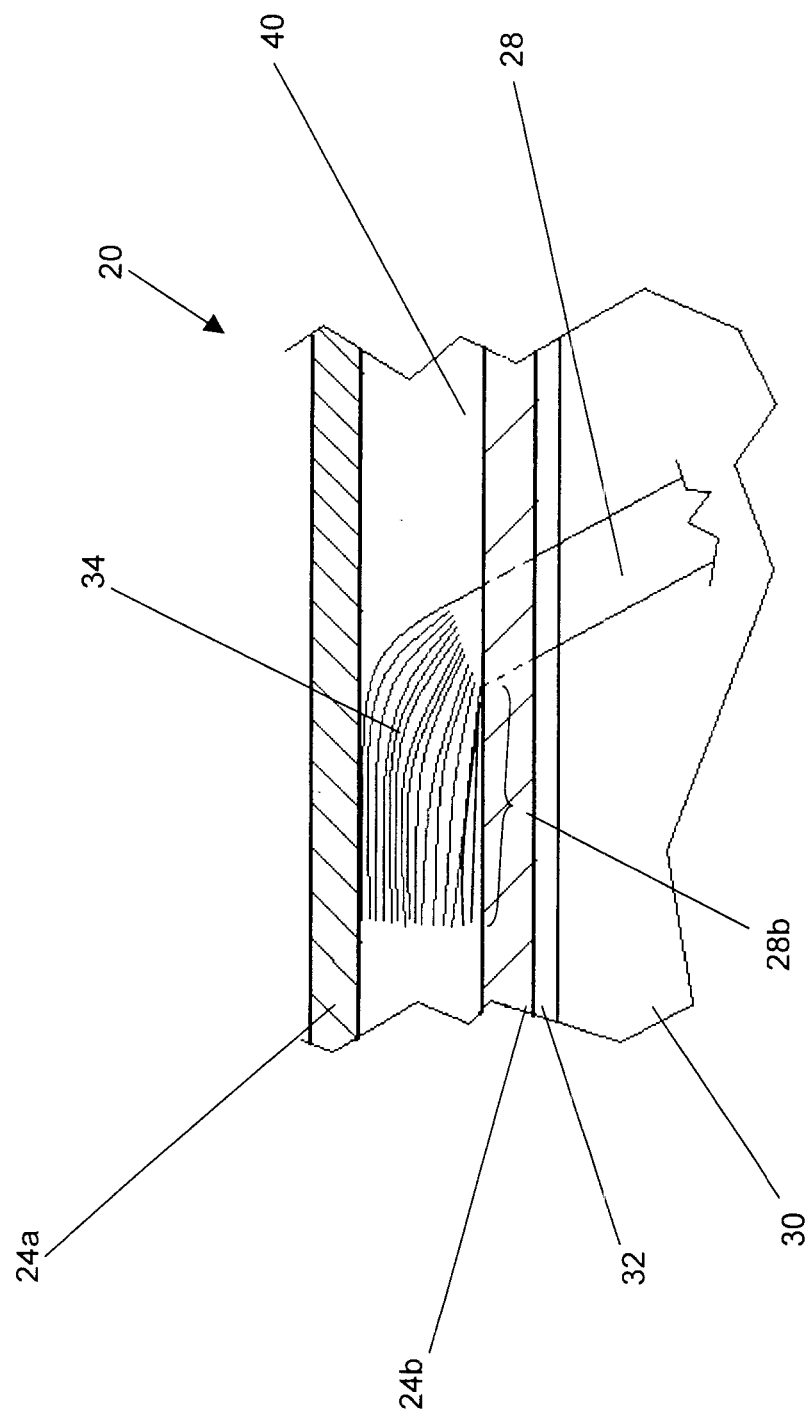
FIG. 5 is a view similar to FIG. 4 but showing the bent ends of the CMC pins having been bonded between plies of a facesheet.

As previously noted, in the embodiment illustrated in FIGS. 2 and 5, the distal portions 28b are sandwiched between and bonded to adjacent plies 24a, 24b, and 26a, 26b of the corresponding facesheets 24, 26. The strength of the bond between each of the pins 28 and the facesheets 24, 26 may be determined in part by the length over which the distal portion 28b is bonded to the facesheets 24, 26. In the final, cured sandwich construction 20, the use of applied adhesives along with ceramic matrix material derived from the plies 24a, 24b, 26a, 26b function to bond the distal portions 28b of the pins 28 to the facesheets 24, 26.

An alternate embodiment 20a of the sandwich construction is shown in FIG. 6. In this embodiment, the distal portions 28b of the pins 28 are bonded directly to the inside, opposing faces of the facesheets 24, 26 through a layer 40 of adhesive which may comprise a film adhesive applied during the fabrication process and/or matrix material derived from the facesheets 24, 26.

Attention is now directed to FIGS. 3, 4, 5, 7 and 8 which disclose a method for fabricating the CMC sandwich structure 20 described above. Beginning with step 42 (FIG. 7), material for forming the pins 28 is fabricated using for example, without limitation, a poltrusion process which is known in the art. Fabrication of the pins 28 may be tailored to facilitate the process that is later used to remove the matrix material from the ends of the pins to expose the ceramic fibers.

Figure 8:
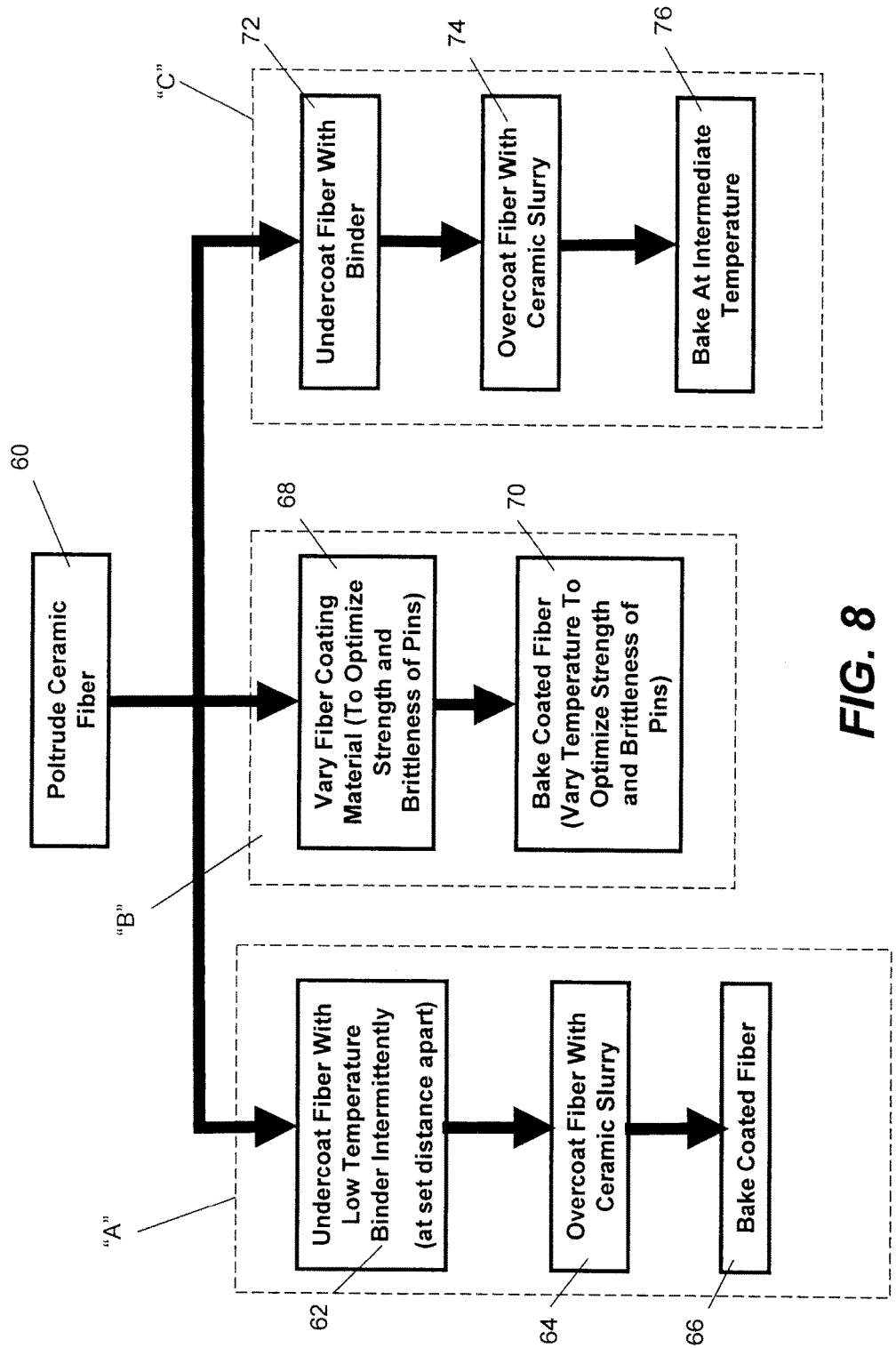
FIG. 8 is a simplified flow diagram illustrating alternative steps for fabricating the ceramic pin stock.

Referring particularly to FIG. 8, a continuous length of pin stock may be fabricated by poltrusion in which ceramic fibers are poltruded, as shown at step 60. Next, any of three processes designated as "A", "B", and "C" may be used to form a pin construction using materials and processes that render the pin more amenable to subsequent processes used to remove the matrix from the ends of the pins. Thus, using process "A", the protruded ceramic fibers are undercoated at step 62 with a low temperature coating such as epoxy at a set interval. Next, at step 64, the undercoated fibers are overcoated with a ceramic slurry, and then baked at step 66. The alternative process "B" begins at step 68 in which the ceramic fibers are coated with a material to tailor the strength and brittleness of the pins. Similarly, a varying temperature baking schedule may be used at step 70 to better enable removal of the matrix with mechanical, thermal or chemical means. The alternative process "C" begins with undercoating the fibers with an epoxy or similar coating at step 72, following which, at step 74, the undercoated fibers are overcoated with a ceramic slurry. Then, at step 76, the coated fibers are baked at an intermediate temperature.

Returning now to FIG. 7, the pin stock having been fabricated at step 42, a suitable carrier 30 is fabricated at step 44, which may comprise forming a layer of light weight, low density foam or ceramic material as previously described. Depending upon the process used to remove the matrix binder from the pins 28 in a later step, a protective coating 32 may be optionally applied to the carrier 30 at step 46 in order to protect the carrier 30 against erosion or other damage during the matrix removal procedure.

At step 48, the individual pins 28 are inserted into the carrier 30. The pin insertion process may be carried out using known equipment designs that insert the pin stock into the carrier 30 at predetermined angles and then cuts the pin stock to the desired final length of the pin 28. This pin insertion process is performed such that the outer ends of the pins remain exposed, protruding from the carrier 30.

Figure 4:
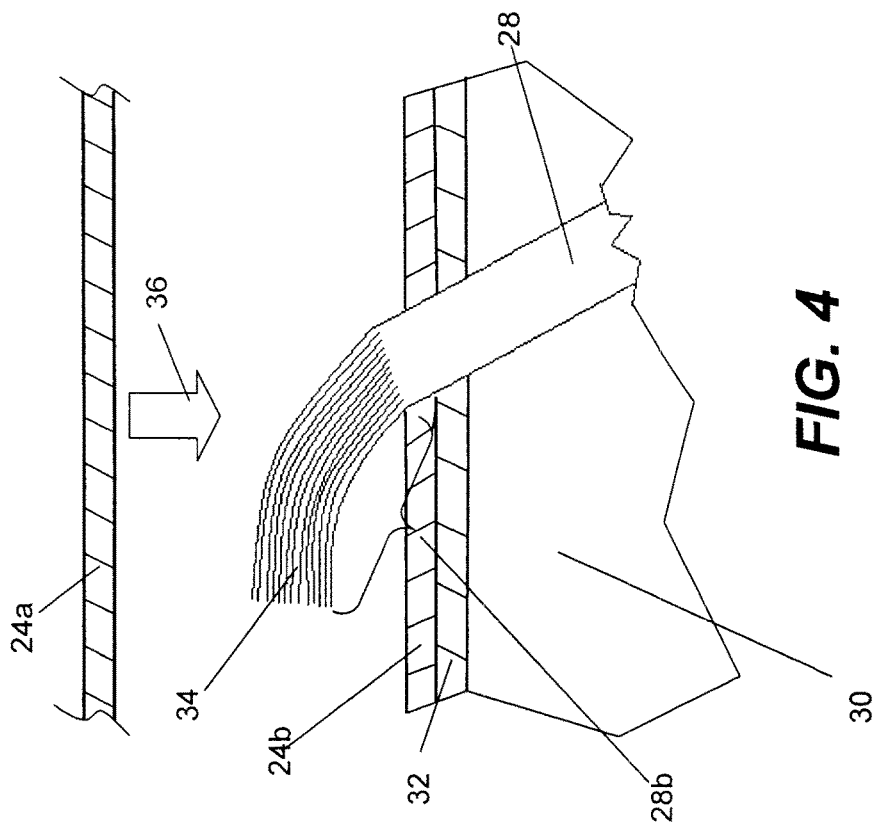
FIG. 4 is a cross sectional view illustrating another step in the method.
Figure 3:
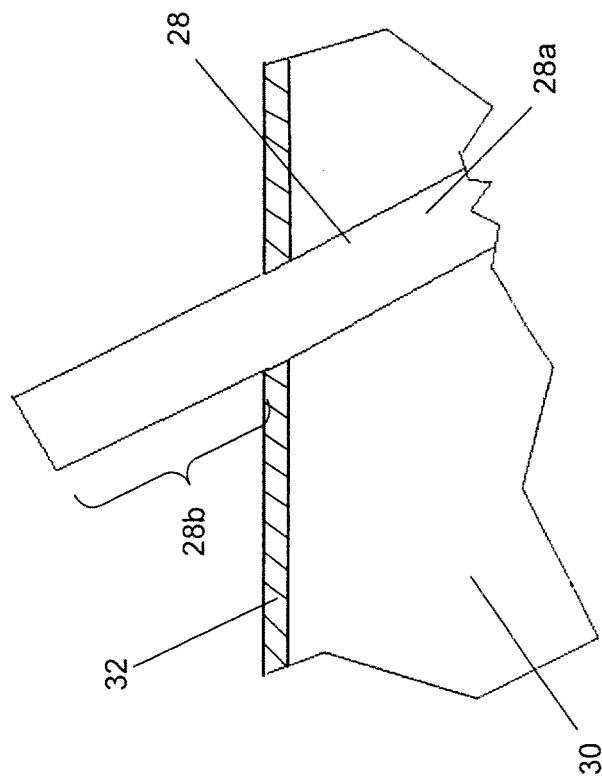
FIG. 3 is a cross sectional view illustrating one step of a method for making the CMC sandwich construction.

Next, at step 50, one or two plies of prepreg may be optionally applied over the surface of the truss core, with the ends of the pins 28 passing through the prepreg layers in order to better bind and lock the pins 28 in the facesheets 24, 26. At step 52, the ends of the pins 28 are then flayed by removing the matrix binder in the distal portions 28b using any of several processes. Removal of the rigid matrix binder exposes the ceramic fibers 34 in the distal portions 28b, as shown in FIGS. 4 and 5. The exposed, individual ceramic fibers in the ends of the pins 28 are relatively flexible, due to their relatively small diameter, thus allowing the distal portions 28b to be bent or flayed so as to lie parallel to the facesheets 24, 26.

The matrix binder may be removed from the distal portions 28b of the pins 28 by chemical etching, pulverizing, or other forms of mechanical or ablative processes which may include, but are not limited to, erosion, evaporation, melting and vaporization. For example, the ends of the truss core may be immersed in a chemical etchant so as to subject the distal portions 28b to chemical etching which removes the matrix binder. During this process, the coating 32 protects the medial portions 28a of the truss core from damage. One mechanical process for removing the matrix binder from the ends of the pins may comprise crushing the pin ends between two platens or similar mechanical apparatus. Other chemical processes may be used to remove the matrix binder from the pin ends which are particularly formulated to remove the undercoating and/or overcoating applied to the ceramic fibers as previously described with reference to FIG. 8.

In those applications in which the protective coating 32 is applied to the carrier 30, step 54 may be optionally performed, consisting of the removal of the protective coating 32 by any of several suitable processes, including incineration (burning).

At step 56, the lay-up sandwich is placed on a tool, following which, at step 58, the lay-up is cured and sintered in order to bond the prepreg to the core and create a fully cured sandwiched construction. Mechanical pressure may be applied in the direction of the arrow 36 (FIG. 4) in order to compact the plies and force the exposed fibers 34 to lie flat, parallel to plies 24a, 24b.

Figure 10:
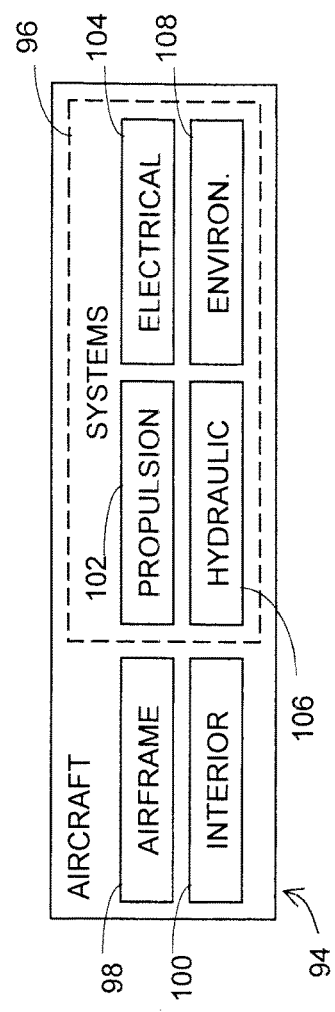
FIG. 10 is a block diagram of an aircraft.
Figure 9:
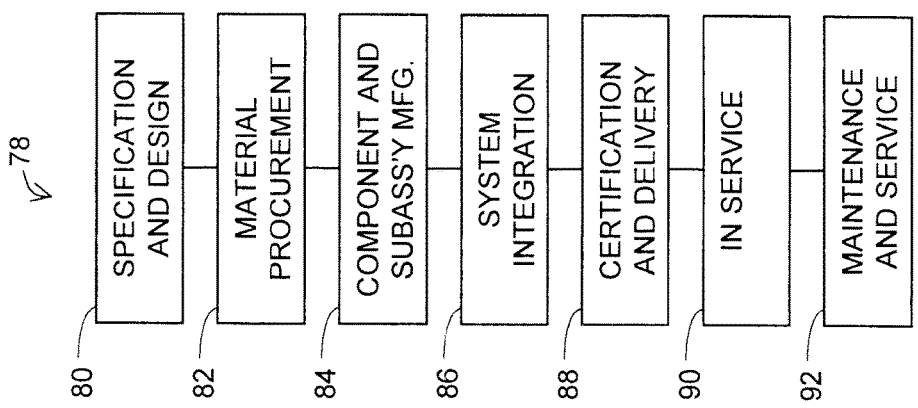
FIG. 9 is a flow diagram of an aircraft production and service methodology.

Referring now to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of making a ceramic composite structure, comprising the steps of:
    forming a ceramic core, the ceramic core including a ceramic truss comprising a plurality of pins formed from ceramic fibers held in a rigid ceramic binder;
    removing the rigid ceramic binder from ends of the pins to expose the ceramic fibers;
    bending the ends of the pins;
    bonding a facesheet to the ends of the pins; and
    protecting a portion of the ceramic core during the removal of the rigid ceramic binder by applying a protective coating to the portion.

2. A method of making a ceramic composite structure, comprising the steps of:
forming a ceramic core, the ceramic core including a ceramic truss comprising a plurality of pins formed from ceramic fibers held in a rigid ceramic binder;
removing the rigid ceramic binder from ends of the pins to expose the ceramic fibers, wherein removing the rigid ceramic binder is performed by etching the ends of the pins;
bending the ends of the pins; and
bonding a facesheet to the ends of the pins.

3. A method of making a ceramic composite structure, comprising the steps of:
forming a ceramic core using ceramic fibers, the ceramic core including a ceramic truss comprising a plurality of pins formed from ceramic fibers held in a rigid ceramic binder;
removing the rigid ceramic binder from ends of the pins to expose the ceramic fibers, wherein removing the rigid ceramic binder is performed by pulverizing the ends of the pins;
bending the ends of the pins; and
bonding a facesheet to the ends of the pins.

4. A method of making a ceramic truss core used in a ceramic composite structure, the ceramic truss core including ceramic fibers, the method comprising the steps of:
forming a ceramic truss using a plurality of ceramic composite pins, wherein the plurality of ceramic composite pins comprise ceramic fibers held in a matrix comprising a rigid ceramic, wherein forming includes:
inserting pin stock into a carrier material, and
cutting the plurality of ceramic composite pins stock to a length such that ends of the plurality of ceramic composite pins extend beyond the carrier material;
removing the matrix from ends of the plurality of ceramic composite pins to expose the ceramic fibers; and
applying a coating on the carrier material that protects the carrier material during removal of the matrix.

5. A method of making a ceramic truss core used in a ceramic composite structure, the ceramic truss core including ceramic fibers, the method comprising the steps of:
forming a ceramic truss using a plurality of ceramic composite pins, wherein the plurality of ceramic composite pins comprise ceramic fibers held in a matrix comprising a rigid ceramic; and,
removing the matrix from ends of the plurality of ceramic composite pins to expose the ceramic fibers, wherein removing is performed by etching the matrix.

6. A method of making a ceramic truss core used in a ceramic composite structure, the ceramic truss core including ceramic fibers, the method comprising the steps of:
forming a ceramic truss using a plurality of ceramic composite pins, wherein the plurality of ceramic composite pins comprise ceramic fibers held in a matrix comprising a rigid ceramic; and,
removing the matrix from ends of the plurality of ceramic composite pins to expose the ceramic fibers, wherein removing is performed by pulverizing the matrix.

7. A method of making a ceramic composite structure, comprising the steps of:
fabricating a ceramic core by:
forming an array of ceramic composite pins each comprising ceramic fibers held in a rigid ceramic matrix,
surrounding portions of the array in a carrier such that ends of the ceramic composite pins protrude from the carrier, the carrier being made of ceramic fibers,
removing the rigid ceramic matrix from protruding ends of the ceramic composite pins to expose portions of the ceramic fibers,
protecting the carrier during the removal of the rigid ceramic matrix by applying a protective coating to the carrier, and
bending exposed portions of the ceramic fibers; and
bonding a facesheet to the ceramic core by bonding the facesheet to exposed, bent ends of the ceramic fibers.

8. A method of making a ceramic composite structure, comprising the steps of:
fabricating a ceramic core by:
forming an array of ceramic composite pins each comprising ceramic fibers held in a rigid ceramic matrix,
surrounding portions of the array in a carrier such that ends of the ceramic composite pins protrude from the carrier,
removing the rigid ceramic matrix from protruding ends of the ceramic composite pins to expose portions of the ceramic fibers, wherein removing is performed by etching the rigid ceramic matrix in the protruding ends of the ceramic composite pins,
bending exposed portions of the ceramic fibers; and
bonding a facesheet to the ceramic core by bonding the facesheet to exposed, bent ends of the ceramic fibers.

9. A method of making a ceramic composite structure, comprising the steps of:
fabricating a ceramic core by:
forming an array of ceramic composite pins each comprising ceramic fibers held in a rigid ceramic matrix,
surrounding portions of the array in a carrier such that ends of the ceramic composite pins protrude from the carrier,
removing the rigid ceramic matrix from protruding ends of the ceramic composite pins to expose portions of the ceramic fibers, wherein removing is performed by pulverizing the rigid ceramic matrix in the protruding ends of the ceramic composite pins,
bending exposed portions of the ceramic fibers; and
bonding a facesheet to the ceramic core by bonding the facesheet to exposed, bent ends of the ceramic fibers.

10. The method of claim 1, further comprising:
determining a strength of a bond needed between the pins and the core, wherein the determined strength is based on a length of the ends; and
cutting the pins such that the ends of the pins are of the length to achieve the needed strength of the bond.

11. The method of claim 10, wherein the pins include a diameter and the length is four or five times the diameter.

12. The method of claim 1, wherein the rigid ceramic binder is made of a material that tailors strength and brittleness of the pins.

13. The method of claim 12, wherein the material includes a low temperature epoxy overcoated with a ceramic slurry.

* * * * *